Patented June 13, 1950

2,511,712

UNITED STATES PATENT OFFICE 2,511,712

PROCESS FOR PRODUCING A SOLUBLE AROMATIC COFFEE EXTRACT

Tibor Holzer, Zurich, Switzerland, assignor to E. Osswald, Zurich, Switzerland

No Drawing. Application September 11, 1947, Serial No. 773,519. In Switzerland April 23, 1946

Section 1, Public Law 690, August 8, 1946
Patent expires April 23, 1966

1 Claim. (Cl. 99—71)

It is known in the art to subject coffee, roasted or not, to an extraction process by the aid of hot or cold water, and to thus produce, from the solution obtained, a completely soluble coffee-extract through evaporation and atomizing. It thus has been proposed, e. g., to extract raw coffee, and then to roast the raw-coffee extract at 225° C. All such extracts, however, have the disadvantages that the so-called coffee-aroma partly gets lost in the course of the technical operations which have to be performed with the extract solution, and that the beverage made of such extracts, therefore, has a flat taste which reminds one little of coffee.

In accord with my present invention, now, it is proposed to ensure the conservation of this coffee aroma by roasting the green coffee-beans—in the presence of at least one carbohydrate which does not produce any caramelizing products which impair the coffee aroma—so that only part of the coffee-aroma substances is liberated, whereupon—after lixiviating the roasted product and evaporating the extract—the residue is further aromatized by a further heating.

The coffee may be roasted in the ground or whole state. The final coffee aroma is fully developed, as has been shown, only when making the coffee beverage, i. e. when mixing the extract with hot water.

The coffee extract may be made, e. g., as follows:

100 parts (by weight) of green, ground or whole coffee beans are mixed with 20–30 parts (by weight) of pulverized glucose and only roasted until part of the coffee aroma is liberated or developed, the carbohydrate being caramelized. The mixture then is quickly cooled and extracted hot, in a closed vessel and in known manner, with 300 parts of water. The solution then is filtered, and such operation repeated twice. The extract solution thus obtained is concentrated, if desired, by deep-cooling and freezing, evaporated in vacuo, and the residue further aromatized by a further heating. The coffee-extract thus obtained may be marketed in powder form or in form of pills and the like.

The product made according to my present process furnishes a good, aromatic coffee-beverage when mixed with the hot water.

In place of glucose, one also may use dextrose, maltose, or a mixture of one or all of these carbohydrates.

The extract powder also may be mixed with milk powder, pressed into pill form, and, if desired, be sugar-coated.

What I claim and desire to secure by Letters Patent is:

A process for producing a fully soluble aromatic coffee extract in powder form, comprising the steps of mixing 100 parts by weight of green coffee with about 20 to 30 parts by weight of a carbohydrate of the group consisting of glucose, dextrose and maltose, partially roasting said mixture, lixiviating said partially roasted product with water, concentrating the extract by evaporation and again roasting the residue of said evaporation for the purpose of further aromatizing same, the said carbohydrates having the property of not furnishing any caramelizing products in the process, which would impair the coffee aroma.

TIBOR HOLZER.

REFERENCES CITED

The following references are of record in the file of this patent:

UNITED STATES PATENTS

| Number | Name | Date |
|---|---|---|
| 1,175,091 | Vietinghoff | Mar. 14, 1916 |
| 1,367,715 | Pratt et al. | Feb. 8, 1921 |
| 1,499,780 | Oprean | July 1, 1924 |

FOREIGN PATENTS

| Number | Country | Date |
|---|---|---|
| 7,427 of 1910 | Great Britain | Feb. 16, 1911 |